United States Patent [19]
Xiao

[11] Patent Number: 5,411,192
[45] Date of Patent: May 2, 1995

[54] TOTE BAG AND TABLE APPARATUS

[76] Inventor: Ji Xiao, 1564 18th Ave., San Francisco, Calif. 94122

[21] Appl. No.: 84,463

[22] Filed: Jul. 1, 1993

[51] Int. Cl.⁶ .................. A45F 4/00; A47B 23/00; A47B 37/00
[52] U.S. Cl. .................. 224/151; 224/153; 224/275; 224/42.46 R; 108/42; 108/48; 190/11; 190/12 A; 383/4
[58] Field of Search .............. 224/153, 155, 151, 156, 224/275, 42.46 R; 190/11, 12 R, 12 A; 383/4; 108/44, 47, 48, 43, 42

[56] References Cited

U.S. PATENT DOCUMENTS

| | | | |
|---|---|---|---|
| 2,540,165 | 2/1951 | Fiel | 383/4 |
| 2,673,774 | 3/1954 | Di Prima | 190/11 |
| 2,808,680 | 10/1957 | Bereth | 190/11 |
| 2,822,847 | 2/1958 | Cesaroni, Jr. | 190/11 |
| 2,921,824 | 1/1960 | Richter | 108/44 |
| 5,148,755 | 9/1992 | Morales | 108/47 |

FOREIGN PATENT DOCUMENTS

| | | | |
|---|---|---|---|
| 3047718 | 7/1982 | Germany | 383/4 |
| 699602 | 11/1953 | United Kingdom | 224/155 |

Primary Examiner—Linda J. Sholl
Attorney, Agent, or Firm—Hugh E. Smith

[57] ABSTRACT

A folding table disposed within a tote bag which may be extended therefrom to rest on a surface or, alternatively, suspend from an automobile seat and the like. The table may be positioned at various angles relative to the supporting surface so as to maintain a level position and it includes both a drink holder and a book holder for securing a position of such articles upon the table. The apparatus further includes a pair of carrying straps configurable into either a backpack harness or a handbag strap and is also provided with a table cloth which may be unrolled therefrom for subsequent use.

11 Claims, 6 Drawing Sheets

TOTE BAG AND TABLE APPARATUS

BACKGROUND OF THE INVENTION

1. Field of the Invention

The present invention relates to tables and more particularly pertains to a tote bag and table apparatus which includes a folding table disposed within a tote bag that may be extended therefrom.

2. Description of the Prior Art

The use of tables is known in the prior art. More specifically, tables heretofore devised and utilized for the purpose of supporting objects in a horizontal position relative to an attaching surface are known to consist basically of familiar, expected and obvious structural configurations, notwithstanding the myriad of designs encompassed by the crowded prior art which have been developed for the fulfillment of countless objectives and requirements.

For example, a vehicle snack tray is illustrated in U.S. Pat. No. 3,785,300 which may be attached to a vehicle seat is adapted to pivot between an extended position where it is locked for use and a folded storage position.

An adjustable folding table apparatus for attachment to a seat-back for use primarily within an automobile or other vehicle is disclosed in U.S. Pat. No. 5,046,433. The apparatus includes a tray portion rotatable between a substantially vertical stored position and a substantially horizontal extended position, extended from a portion of a seat-back and employing a series of flexible straps to enable both facilitated attachment and detachment of the apparatus from the seat-back.

Another patent of interest is U.S. Pat. No. 4,852,499 which describes an adjustable folding table for vehicles including a pair of generally planar table halves pivotally secured to a cylindrical L-shaped support member in which the table is configurable to a folded or closed position and may be pivoted to a storage position within the vehicle interior.

While these devices fulfill their respective, particular objects and requirements, the aforementioned patents do not disclose a folding table disposed within a tote bag which may be extended therefrom to rest on a surface or suspend from an automobile seat. Furthermore, the prior art makes no mention of a storable tablecloth, a magnetic drink holder, a book rest, and other features of the instant invention.

Therefore, it can be appreciated that there exists a continuing need for a new tote bag and table apparatus which includes a folding table disposed within a tote bag that may be extended therefrom to rest on a surface or suspend from an automobile seat. In this regard, the present invention substantially fulfills this need.

SUMMARY OF THE INVENTION

In view of the foregoing disadvantages inherent in the known types of tables now present in the prior art, the present invention provides a new tote bag and table apparatus construction wherein the same can be utilized as a portable table storable within a tote bag which may be extended therefrom to rest on a surface or suspend from an automobile seat. As such, the general purpose of the present invention, which will be described subsequently in greater detail, is to provide a new tote bag and table apparatus and method which has many of the advantages of the tables mentioned heretofore and many novel features that result in a tote bag and table apparatus which is not anticipated, rendered obvious, suggested, or even implied by any of the prior art tables, either alone or in any combination thereof.

To attain this, the present invention essentially comprises a folding table disposed within a tote bag which may be extended therefrom to rest on a surface or, alternatively, suspend from an automobile seat and the like. The table may be positioned at various angles relative to the supporting surface so as to maintain a level position and it includes both a drink holder and a book holder for securing a position of such articles upon the table. The apparatus further includes a pair of carrying straps configurable into either a backpack harness or a handbag strap and is also provided with a table cloth which may be unrolled therefrom for subsequent use.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tote bag and table apparatus which has many of the advantages of the tables mentioned heretofore and many novel features that result in a tote bag and table apparatus which is not anticipated, rendered obvious, suggested, or even implied by any of the prior art tables, either alone or in any combination thereof.

It is another object of the present invention to provide a new tote bag and table apparatus which may be easily and efficiently manufactured and marketed.

It is a further object of the present invention to provide a new tote bag and table apparatus which is of a durable and reliable construction.

An even further object of the present invention is to provide a new tote bag and table apparatus which is susceptible of a low cost of manufacture with regard to both materials and labor, and which accordingly is then susceptible of low prices of sale to the consuming public, thereby making such tote bag and table apparatus economically available to the buying public.

Still yet another object of the present invention is to provide a new tote bag and table apparatus which provides in the apparatuses and methods of the prior art some of the advantages thereof, while simultaneously overcoming some of the disadvantages normally associated therewith.

Still another object of the present invention is to provide a new tote bag and table apparatus which includes a folding table disposed within a tote bag that may be extended therefrom.

Yet another object of the present invention is to provide a new tote bag and table apparatus which includes a pair of carrying straps configurable into either a backpack harness or a handbag strap.

Even still another object of the present invention is to provide a new tote bag and table apparatus which may be positioned at various angles relative to a supporting surface so as to maintain a level position.

Even still yet another object of the present invention is to provide a new tote bag and table apparatus which includes both a drink holder and a book holder for securing a position of such articles upon the table.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1-8 thereof, a new tote bag and table apparatus embodying the principles and concepts of the present invention and generally designated by the reference numeral 10 will be described.

Figures 1, 2:
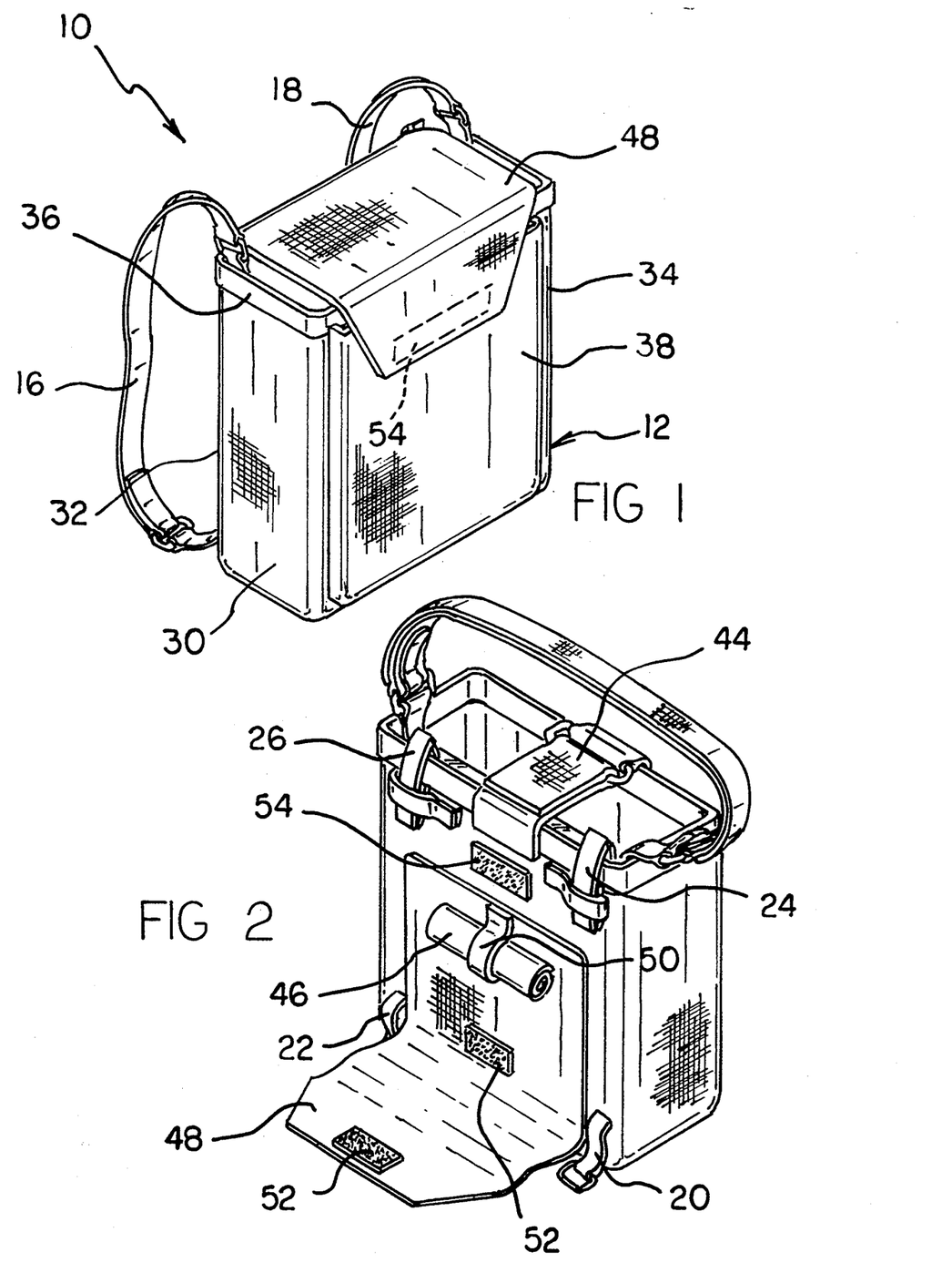
FIG. 1 is a perspective view of a tote bag and table apparatus comprising the present invention.
FIG. 2 is a perspective view of a rear area of the present invention.

The tote bag and table apparatus 10 comprises a bag assembly 12 which contains a folding table assembly 14 therein. A pair of carrying straps 16, 18 are coupled to the table assembly 14 which may be connected to a pair of backpack anchors 20, 22 to allow the tote bag and table apparatus 10 to be carried upon a dorsal portion of a user. The carrying straps 16, 18 may also be coupled to each other, as best shown in FIG. 2, to form a carrying handle by which the tote bag and table apparatus 10 may be transported. A pair of hooks 24, 26 are pivotally connected to the table assembly 14 so that the tote bag and table apparatus may be suspended from an automobile seat, a vehicle dashboard, and the like, whereby the table assembly may be released therefrom into an operable position. Moreover, the tote bag and table apparatus 10 includes a wire support 28 which allows the table assembly 14 to be extended from the bag assembly 12 and positioned upon a horizontal surface such as the ground, a picnic table, and the like.

More specifically, it will be noted that the tote bag and table apparatus 10 comprises a fabric bag 30 which is substantially rectangularly shaped in which a rear area 32, a front area 34, and a reinforced peripheral opening 36 are defined. A pocket 38 is integrally or otherwise formed upon the front area 34 and serves as an alternate, separated container in which to store objects. The table assembly 14 is contained within the bag 30 and its associated hooks 24, 26 are secured in a stored position against the bag by a pair of hook straps 40, 42 which are releasably coupled to the bag by unillustrated hook and loop fasteners.

Figure 3:
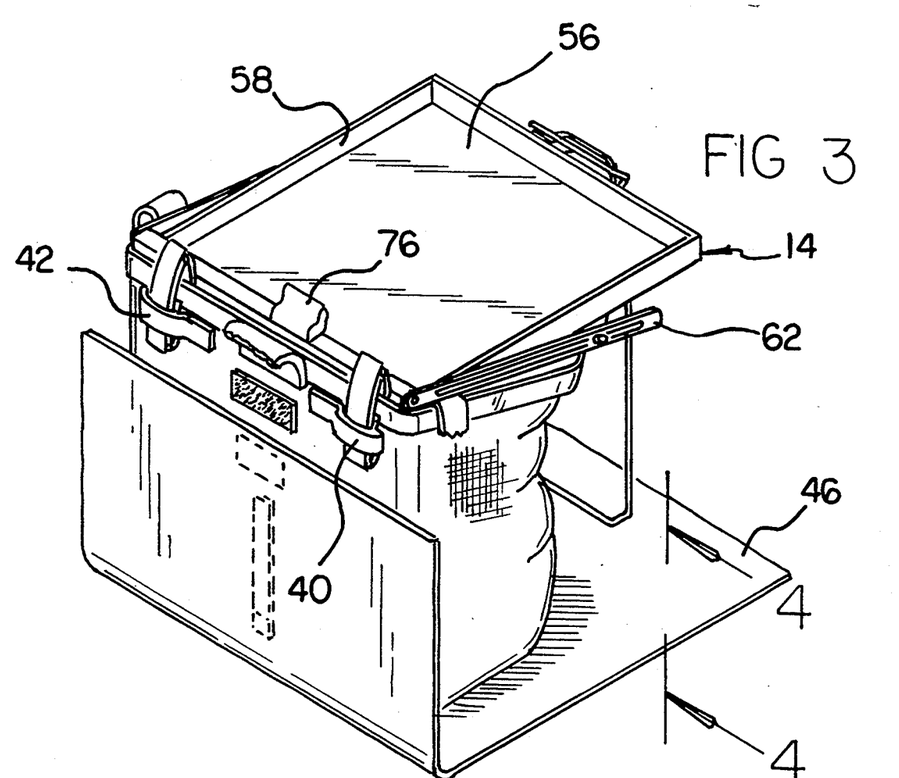
FIG. 3 is a perspective view from the rear area of the invention showing a table extending therefrom.

The bag assembly 12 further includes a securing strap 44, a tablecloth 46, and a cover 48. The securing strap 44 is releasably connected to both the rear area 32 and the front area 34, as best shown in FIG. 2, and is also coupled thereto by releasable hook and loop fasteners. The tablecloth 46 is secured to the bag 30 and may be rolled into stored position, whereby a tablecloth strap 50 may secure the tablecloth in the stored position by encircling the rolled tablecloth and securing it to the bag with hook and loop fasteners. In use, the tablecloth 46 may be released and positioned underneath the bag as shown in FIG. 3. The cover 48 is formed of a similar material as that of the bag 30 and is stitched thereto. The cover 48 is operable to enclose the tablecloth 46 and the reinforced peripheral opening 36 where it may be secured in a closed position by hook and loop fasteners 52 located thereon which engage appropriate fastening material 54 secured to the bag in both the rear area 32 and the front area 34.

The carrying straps 16, 18 may be arranged in such a manner so as to allow the apparatus 10 to be worn as a backpack, as shown in FIG. 1, or as a handbag, as shown in FIG. 2. The carrying straps 16, 18 also include hook and loop fasteners present thereon which allow them to be secured to the backpack anchors 20, 22 in a well understood manner. The carrying straps 16, 18 may also be secured to each other to form a unitary strap that allows the tote bag and table apparatus 10 to be carried like a handbag. In addition, the hooks 24, 26 may be utilized to attach the apparatus 10 to a car-seat, a vehicle dashboard, or other furniture. The hooks may also be stowed against the bag 30 by a use of the hook straps 40, 42 as described above.

Figure 4:
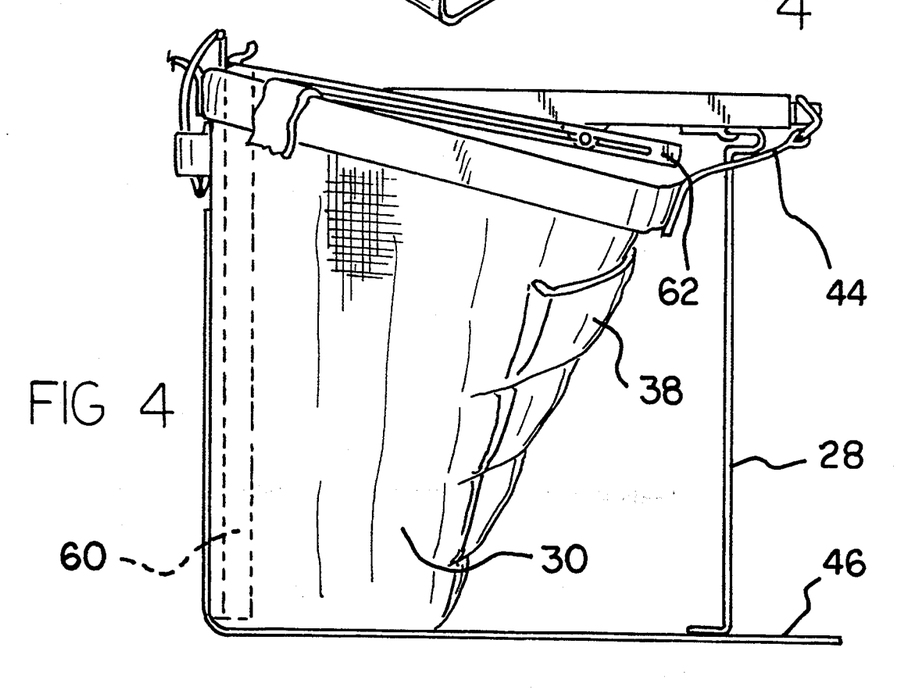
FIG. 4 is a side elevation view as viewed from line 4—4 of FIG. 3.
Figures 5, 6:
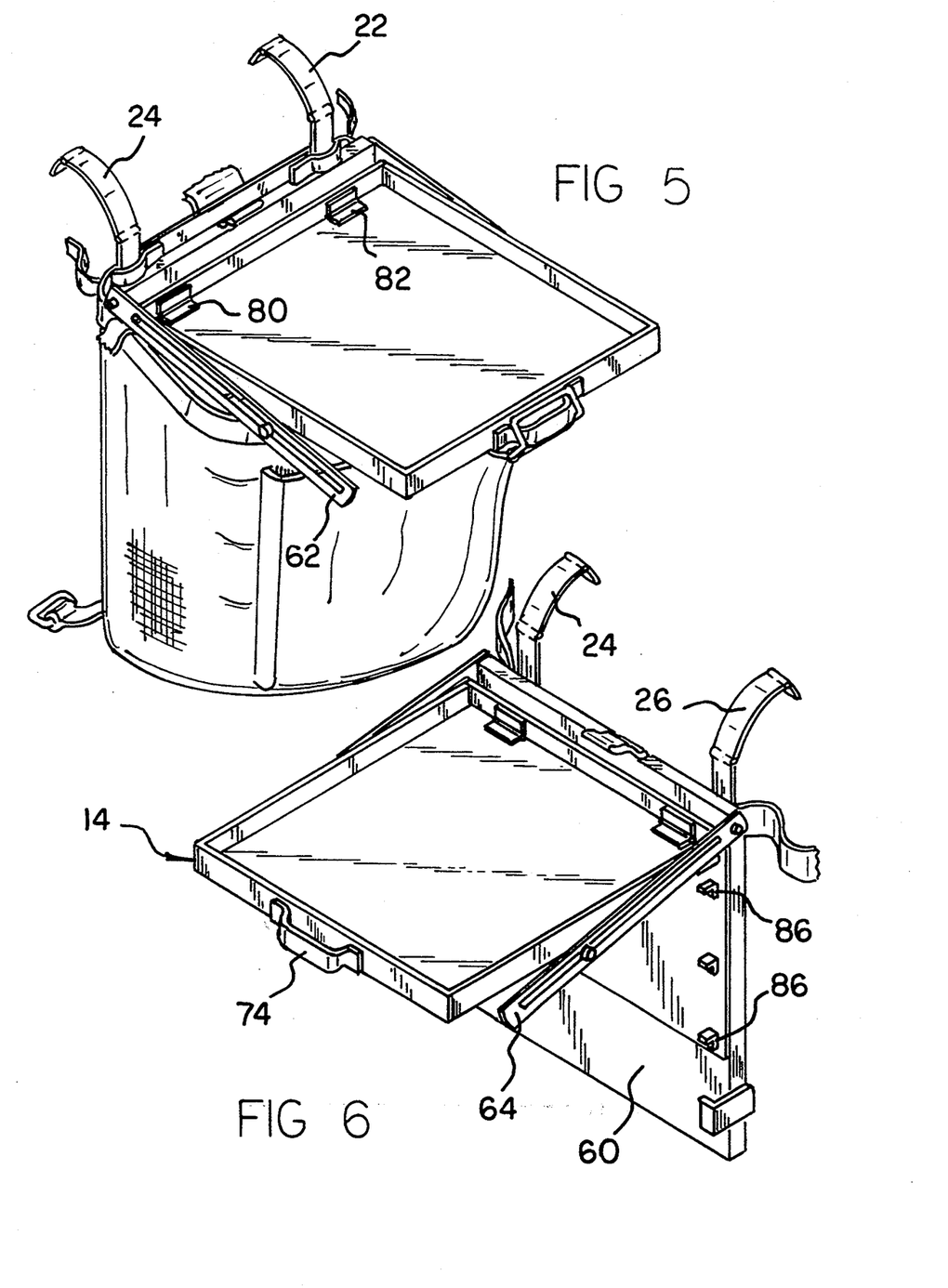
FIG. 5 is a perspective view of instant invention.
FIG. 6 is a perspective view of a table assembly comprising a portion of the invention.

The table assembly 14 is releasably contained within the bag by unillustrated fastening means present therein. The table may be extended from the bag to serve as an outdoor picnic table, a toy table for children, a writing table, an eating table for a vehicle, and the like. A perspective view of the table assembly 14 extended from the bag assembly 12 is shown in FIG. 3. The table assembly 14 comprises a table member 56 having a sidewall 58 integrally or otherwise formed along a periphery therearound. The table member 56 is supported by the wire support 28 and an upright member 60 disposed within the bag 30, as shown in FIG. 4.

Figures 7, 8:
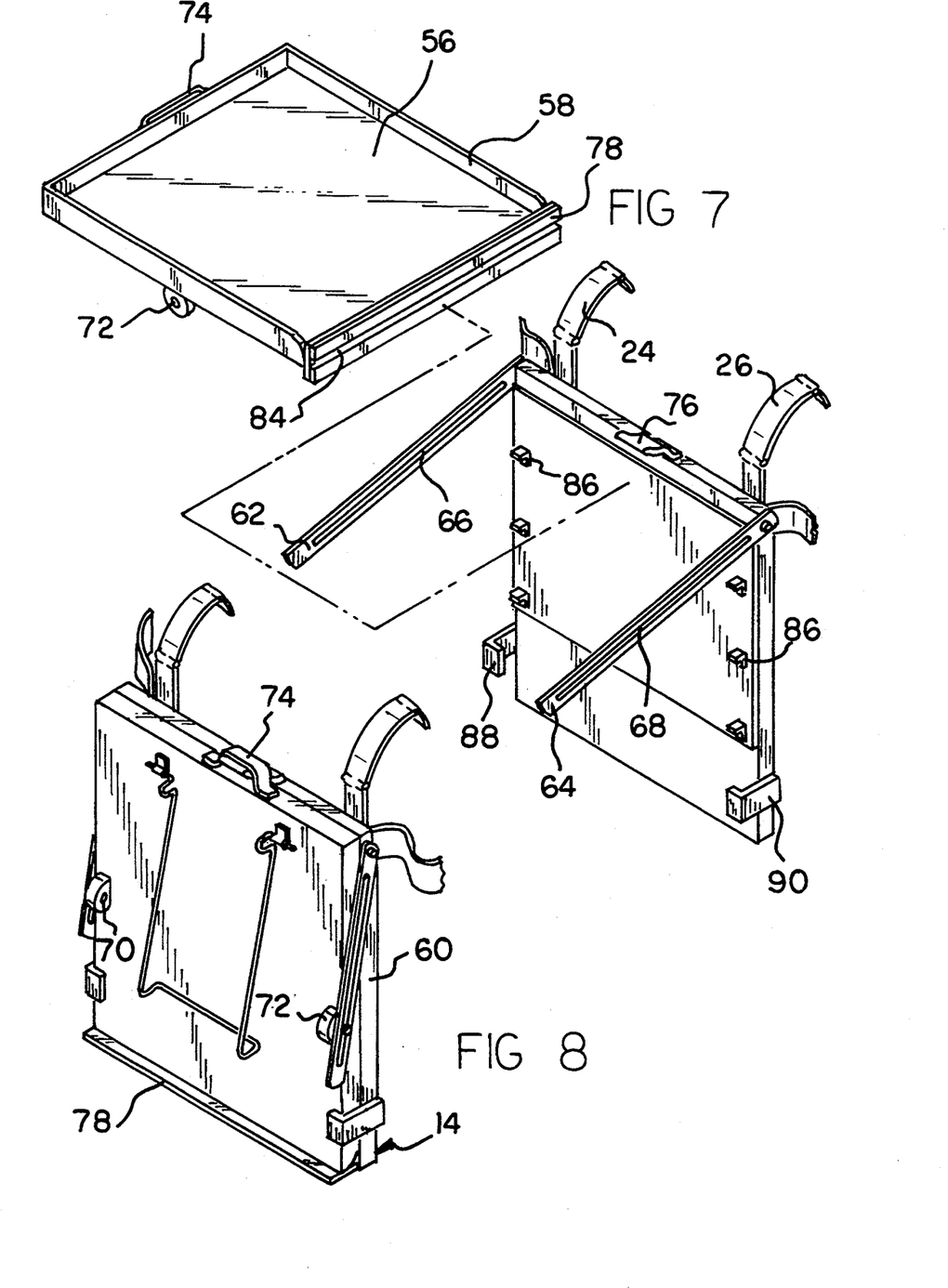
FIG. 7 is a exploded perspective view of the table assembly.
FIG. 8 is a perspective view of the table assembly as folded into a storage position.

A pair of arms 62, 64 are pivotally connected to the upright member 60 and slidably connected to the table member 56 to provide support to the table member when the wire support 28 is not in use, i.e. when the tote bag and table apparatus is suspended from a vertical surface by the hooks 24, 26. The arms 62, 64 are substantially straight members having a length elongated apertures 66, 68 therealong, respectively. A pair of unlabeled pins pass through the elongated apertures 66, 68 and into pin anchors 70, 72 of the table member 56. The pins slide through the elongated apertures 66, 68 and allow the table member 56 to be folded flatly against the upright member 60 as shown in FIG. 8. The elongated apertures 66, 68 may contain notches therein which allow the pins to rest in a preselected position, or alternatively, the pins may be frictionally engaged to the arms 62, 64 to accomplish the same. The table member 56 includes a handle 74 which may be engaged to a clip 76 on the upright member 60 to secure the table member flatly thereagainst.

A magnetic strip 78 is positioned at an end of the table member 56 opposite that of the handle 74. The magnetic strip is coupled to the table member 56 by a pair of hinges 80, 82 which allow the magnetic strip to pivot relative thereto. The magnetic strip 78 has a journal 84 which is operable to receive and engage any of a plurality of projections 86 present on the upright member 60. The projections 86, when coupled with the magnetic strip 78 are operable to support the table member 56 in a plurality of positions on the upright member 60. The table member 56 may then be adjusted relative to the arms 62, 64 into a desired position. After use, the table member 56 may be stored flatly against the upright member 60 and held thereto by a pair of brackets 88, 90 which are fixedly secured to the upright member 60. The aforementioned structure allows the table assembly 14 to be adjusted to a substantially horizontal position when the tote bag and table apparatus 10 is positioned upon a car-seat, dashboard, and the like.

Figure 9:
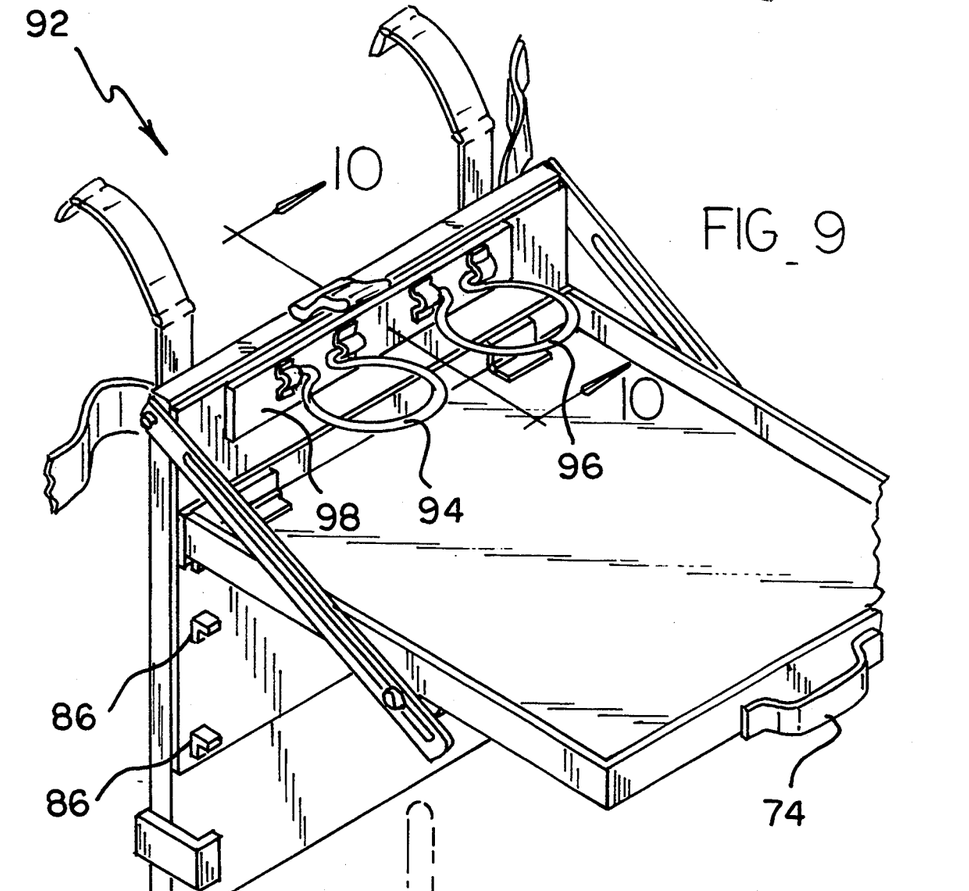
FIG. 9 is a perspective view of an alternate embodiment of the present invention.
Figure 10:
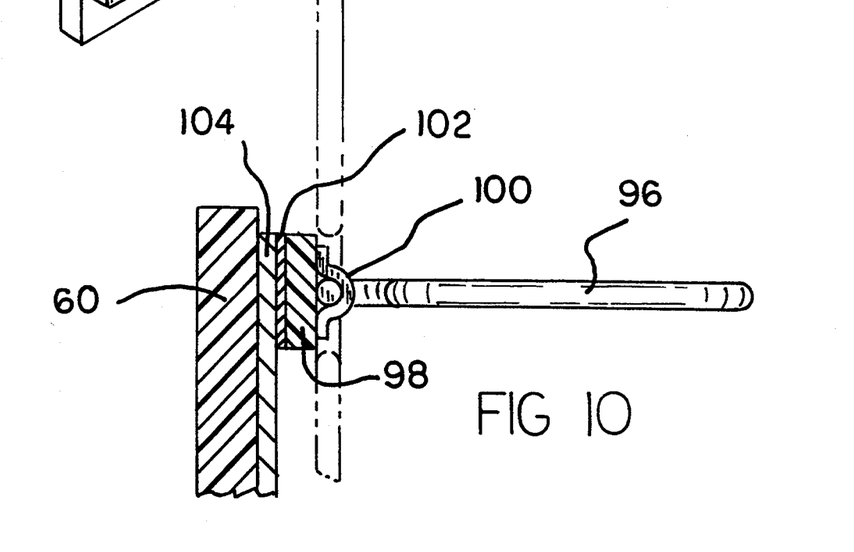
FIG. 10 is a cross-sectional view taken along line 10—10 of FIG. 9.

An alternate embodiment of the present invention as generally designated by the reference numeral 92 which comprises substantially all the features of the foregoing embodiment 10 and which further comprises a pair of drink holders 94, 96 will now be described. As best shown in FIGS. 9-10, it can be shown that the drink holders 94, 96 are pivotally secured to a holding member 98 by a plurality of hinge members 100 and are operable to receive and secure a position of a cup or other drinking container. A magnet 102 is secured to the holding member 98 and allows the holding member to be releasably coupled to a support plate 104 that is secured to the upright member 60. The drink holders 94, 96 may be pivotally adjusted to lie in a plane substantially parallel to a plane defined by that of the table member 56 and may also be folded in such a manner so as to allow the table member to be positioned flatly against the upright member 60.

Figure 11:
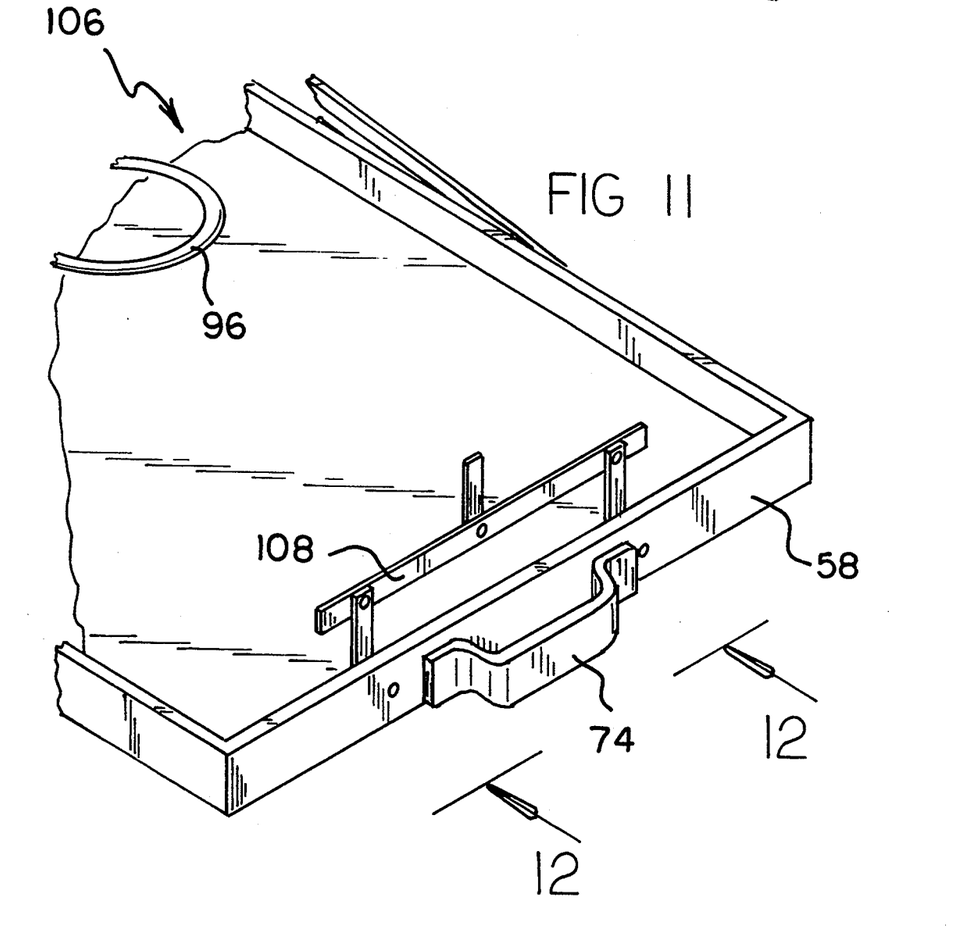
FIG. 11 is a perspective view of a portion of a further embodiment of the present invention.
Figure 12:
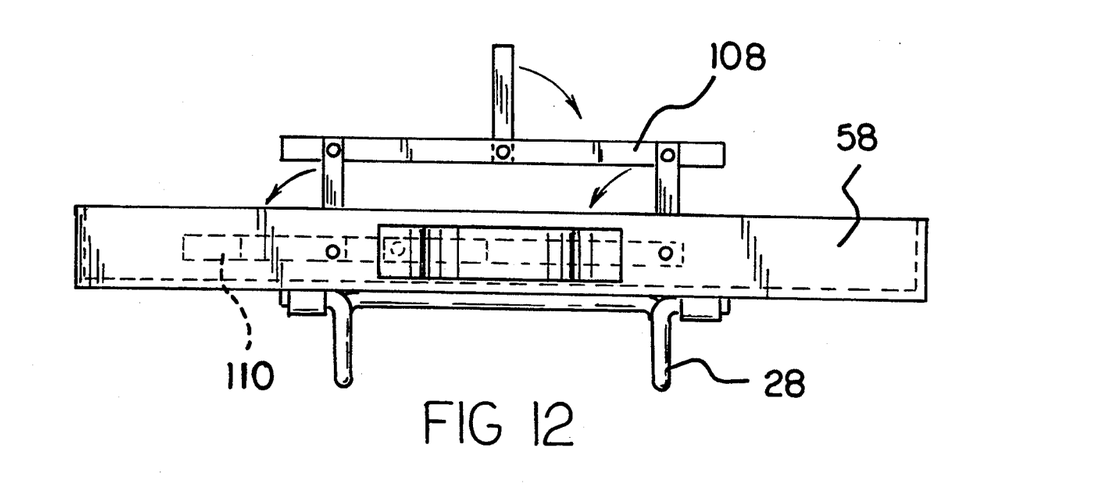
FIG. 12 is a front elevation view as seen from line 12—12 of FIG. 11.

Comprising all the features and structure of the previous embodiments 10, 92 is a further alternate embodiment which is generally designated by the reference numeral 106 and may be viewed in FIGS. 11-12. It can be shown that the further alternate embodiment 106 further comprises a book rest 108 which is pivotally secured to the side wall 58 proximate the handle 74. The book rest 108 may be utilized to retain a book upon the table member 56, or alternatively, the book rest may be placed in a stowed position 110 in a manner indicated by the arrows in FIG. 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tote bag and table apparatus comprising:
 a fabric bag of substantially rectangular shape and having a rear area, a front area, and a peripheral opening;
 a table assembly contained within said bag and extensible from said peripheral opening of said bag, said table assembly comprising an upright member positioned within said bag in abutting relationship with an interior surface of said rear area thereof; a first arm pivotally mounted to a first side of said upright member proximal to a top end thereof; a second arm pivotally mounted to a second side of said upright member proximal to said top and thereof, said first and second arms each having an elongated slot extending along a longitudinal length thereof; a table member positioned between said arms, said table member being pivotally and movably mounted to said arms by a pair of pins, with each of said pins extending through an individual one of said elongated slots and engaging said table member; and means to magnetically couple said table member to said upright member.

2. The tote bag and table apparatus of claim 1, wherein said means to magnetically couple said table member to said upright member comprises a magnetic strip pivotally coupled to an edge of said table member; and a support plate secured to a front face of said upright member, said support plate being comprised of a ferrous material, whereby said magnetic strip can be selectively coupled to said support plate.

3. The tote bag and table apparatus of claim 2, wherein said magnetic strip includes a journal extending longitudinally therealong; and further comprising a plurality of projections extending from said support plate of said upright member, said projections being arranged in spaced pairs and operable to be positioned within said journal of said magnetic strip.

4. The tote bag and table apparatus of claim 3, wherein said table member includes a sidewall extending about at least a portion of a periphery thereof.

5. The tote bag and table apparatus of claim 4, and further comprising a wire support member pivotally coupled to a bottom of said table member for supporting said table member.

6. The tote bag and table apparatus of claim 5, and further comprising a pair of hooks mounted to said upright member for suspending said tote bag and table apparatus.

7. The tote bag and table apparatus of claim 6, and further comprising a securing strap releasably connected to both said rear area and said front area of said bag.

8. The tote bag and table apparatus of claim 7, and further comprising a tablecloth secured to said bag; and a tablecloth strap coupled to said bag and removably securable about said tablecloth when said tablecloth is positioned in a rolled configuration.

9. The tote bag and table apparatus of claim 8, and further comprising a pair of drink holders; a holding member; and a magnet secured to said holding member, said drink holders being pivotally coupled to said holding member with said holding member being magnetically coupled to said support plate of said upright member.

10. The tote bag and table apparatus of claim 9, and further comprising a book rest pivotally secured to said sidewall of said table member.

11. The tote bag and table apparatus of claim 10, and further comprising a pocket coupled to said front area of said bag.

* * * * *